United States Patent
Chen (12) 
(10) Patent No.: US 6,387,247 B1
(45) Date of Patent: May 14, 2002

(54) FEED INJECTION SYSTEM FOR CATALYTIC CRACKING PROCESS

(75) Inventor: Ye-Mon Chen, Sugar Land, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/390,230

(22) Filed: Sep. 3, 1999

(51) Int. Cl.⁷ .............. C10G 11/00; B01J 8/08; B05B 1/00; B05B 7/00
(52) U.S. Cl. .......... 208/113; 208/146; 422/213; 422/214; 239/398; 239/423; 239/424
(58) Field of Search ............ 208/113, 146; 422/213, 214; 239/398, 423, 424

(56) References Cited

U.S. PATENT DOCUMENTS

| | | | |
|---|---|---|---|
| 3,071,540 A | * 1/1963 | McMahon et al. | 208/163 |
| 3,533,558 A | * 10/1970 | Masters | 239/404 |
| 3,642,202 A | * 2/1972 | Angelo | 239/8 |
| 4,097,243 A | 6/1978 | Bartholic | 23/288 |
| 4,405,444 A | 9/1983 | Zandona | 208/113 |
| 4,407,230 A | 10/1983 | Barnert | 118/716 |
| 4,563,334 A | 1/1986 | Hays et al. | 422/140 |
| 4,575,414 A | 3/1986 | Skraba | 208/157 |
| 4,578,183 A | 3/1986 | Chou et al. | 208/113 |
| 4,650,566 A | 3/1987 | Buyan et al. | 208/153 |
| 4,675,099 A | 6/1987 | Skraba | 208/157 |
| 4,747,467 A | 5/1988 | Lyon et al. | 181/218 |
| 4,784,328 A | 11/1988 | Skraba | 239/432 |
| 4,795,547 A | 1/1989 | Barnes | 208/113 |
| 4,808,383 A | 2/1989 | Buyan et al. | 422/140 |
| 4,820,493 A | 4/1989 | Haddad et al. | 422/143 |
| 5,017,343 A | 5/1991 | Cetinkaya | 422/140 |
| 5,108,583 A | 4/1992 | Keon | 208/157 |
| 5,554,341 A | 9/1996 | Wells et al. | 422/145 |
| 5,562,818 A | 10/1996 | Hedrick | 208/163 |
| 5,794,857 A | * 8/1998 | Chen et al. | 239/430 |
| 6,143,457 A | 11/2000 | Holtan et al. | 261/78.2 |

FOREIGN PATENT DOCUMENTS

| | | |
|---|---|---|
| CA | 1015004 | 8/1977 |
| EP | 0147664 | 7/1985 |
| EP | 151882 | 8/1985 |
| EP | 239171 | 9/1987 |
| EP | 593171 A1 | 4/1994 |
| EP | 773276 A1 | 5/1997 |
| WO | 1530509 | 11/1978 |

OTHER PUBLICATIONS

James R. Murphy, "Evolution Design Changes Mark FCC Process", Oil and Gas Journal, May 18, 1992, pp. 49–58.

* cited by examiner

Primary Examiner—Walter D. Griffin (57) ABSTRACT

A catalytic cracker riser reactor is connected to a regenerator standpipe through which hot, regenerated catalyst enters the riser bottom region. A hydrocarbon feed, such as gas oil, and dispersing gases, such as steam, are introduced through a single bottom entry nozzle assembly. The nozzle assembly comprises three concentrically arranged conduits. An inner conduit provides a passageway for a first dispersing gas and terminates in a first cap having at least one outlet passage for discharging the first dispersing gas in a generally radially outward and upward direction. The first conduit and first cap are enclosed by a second conduit and second cap, the annulus formed thereby providing a passageway for a liquid hydrocarbon feed. The second cap also has at least one outlet passage for discharging the mixture of hydrocarbon feed and first dispersing gas into the riser reactor in a radially outward and upward direction. A first dispersing gas enters the inner conduit and proceeds to the first cap into a mixing zone located in the vicinity of the discharge passage between the first and second caps. Hydrocarbon feed enters the second conduit, continues through an annulus to the second cap and is mixed with the first dispersing gas in the mixing zone, resulting in the formation of a fine two-phase mixture of small dispersed bubbles in heavy petroleum hydrocarbon liquid. As the fine two-phase mixture passes through the outlet passage into the riser reactor to contact with regenerator catalyst, the two-phase mixture suddenly expands, forming a fine atomization of heavy petroleum hydrocarbon feed with narrow droplet size evenly distributed across the riser reactor.

18 Claims, 4 Drawing Sheets

FEED INJECTION SYSTEM FOR CATALYTIC CRACKING PROCESS

BACKGROUND OF THE INVENTION

1. Field of the Invention

The present invention relates to feed injection systems and, in particular, to feed nozzles used for catalytic cracking processes.

2. Description of Related Art

In a typical Fluid Catalytic Cracking Unit (FCCU) consisting of a regenerator, a riser reactor and a stripper, such as that shown in U.S. Pat. No. 5,562,818 to Hedrick which is incorporated herein by reference, finely divided regenerated catalyst is drawn from the regenerator through the regenerator standpipe and contacts with a hydrocarbon feedstock in a lower portion of a reactor riser. Hydrocarbon feedstock and steam enter the riser through feed nozzles. The mixture of feed, steam and regenerated catalyst, which has a temperature of from about 200° C. to about 700° C., passes up through the riser reactor, converting the feed into lighter products while a coke layer deposits on the surface of the catalyst. The hydrocarbon vapors and catalyst from the top of the riser are then passed through cyclones to separate spent catalyst from the hydrocarbon vapor product stream. The spent catalyst enters the stripper where steam is introduced to remove hydrocarbon products from the catalyst. The spent catalyst containing coke then passes through a stripper standpipe to enter the regenerator where, in the presence of air and at a temperature of from about 620° C. to about 760° C., combustion of the coke layer produces regenerated catalyst and flue gas. The flue gas is separated from entrained catalyst in the upper region of the regenerator by cyclones and the regenerated catalyst is returned to the regenerator fluidized bed. The regenerated catalyst is then drawn from the regenerator fluidized bed through the regenerator standpipe and, in repetition of the previously mentioned cycle, contacts the feedstock in the lower riser.

The most critical element of the FCCU riser reactor design is the feed injection system. For peak performance, it is essential that the feed injection system distributes the feed in fine spray having a uniform coverage across the riser and a narrow droplet size distribution. Such a spray increases the surface area of the feed droplets and facilitates intimate contacting with the regenerated catalyst. Existing feed injection systems of prior art, however, have difficulty in achieving this desired performance.

A typical FCCU can have either side entry nozzles or bottom entry nozzles to introduce the hydrocarbon feed into the riser reactor. Bottom entry nozzles introduce the hydrocarbon feed from the bottom of the riser reactor whereas side entry nozzles introduce the feed from the periphery of the riser reactor and at a higher elevation. Most modern CCUs are designed with side entry nozzles, such as that shown in "Evolutionary Design Changes Mark FCC Process" by J. R. Murphy which is incorporated herein by reference. For FCCUs with side entry configuration, regenerated catalyst is transported upwards from the bottom of the riser by fluidizing gas, usually steam, and the hydrocarbon feed is injected by multiple nozzles mounted on the periphery of the riser reactor at a higher elevation. Modern side entry nozzles, such as disclosed in U.S. Pat. No. 5,794,857 are, in general, good feed atomizers. However, the side entry configuration has several significant drawbacks. The higher feed injection point leads to lower riser reactor volume and lower catalyst circulation, due to higher pressure drop in the riser. The contact of hot, regenerated catalyst with transport steam at the lower riser also leads to higher catalyst deactivation before feed contacting.

Catalytic cracking units with bottom entry nozzles can avoid the drawbacks of the side entry configuration described above. However, prior art bottom entry nozzles are, in general, not as good in feed atomization. U.S. Pat. No. 4,097,243 disclosed a bottom entry nozzle design with multiple tips to distribute feed into multiple streams. Feed atomization was rather poor. In addition, feed was injected in a substantially longitudinal direction of the riser which leads to slow mixing between the feed and the regenerated catalyst because both are moving in a substantially parallel direction. This leads to an undesirable condition of feed contacting with a broad feed vaporization zone in the reactor riser. A number of improvements, such as CA-A-1,015,004, U.S. Pat. No. 4,808,383, U.S. Pat. No. 5,017,343, U.S. Pat. No. 5,108,583, and EP-A-151,882 disclose various means to improve feed atomization for bottom entry nozzles. However, feed atomization remains inadequate, and the feed injection remains substantially longitudinal, leading to slow mixing with regenerator catalyst and undesirable feed contacting in a broad vaporization zone.

U.S. Pat. No. 4,784,328 and EP-A-147,664 disclose two complicated designs of mixing boxes at the bottom of the FCCU reactor riser to improve mixing between feed and regenerated catalyst. However, these mixing boxes have a very complicated geometry with many passages which make it difficult to retain their mechanical integrity and proper functions over time because the lower riser region is extremely erosive.

U.S. Pat. No. 4,795,547 and U.S. Pat. No. 5,562,818 disclose two bottom entry nozzles with different designs of diverter cones at the exit of a substantially longitudinal feed pipe carrying atomized feed. The function of these diverter cones is to redirect the substantially axially flowing feed stream to a somewhat radially discharging feed at the exit, thus intended for enhancing the mixing with the regenerated catalyst. However, there are major drawbacks in these diverter designs. First, the hydrocarbon feed is atomized upstream of the diverter and when the atomized feed impinges on the surface of the diverter cone at the exit, re-coalescence of many of the atomized feed droplets occurs, leading to the formation of sheets of liquid discharging from the cone. The diverter cone achieves a change in the direction of the feed but this comes at the high price of significantly worsening feed atomization. Second, the radially discharging feed in the form of liquid sheets from the diverter cone can penetrate through catalyst in the riser without much vaporization and impinges on the riser wall, leading to major mechanical damage.

The instant invention provides an improved feed injection system for use in catalytic cracking processes which will result in better feed distribution in the reactor riser. One objective of the instant invention is to improve feed atomization and distribution of the bottom entry injection system, thus eliminating the need for a side entry configuration and its drawbacks. Another objective of the instant invention is to discharge the atomized feed in a substantially radial direction for better mixing with regenerated catalyst, but without using a diverter cone. Yet another objective of the instant invention is to be able to discharge the atomized feed in a substantially radial direction, but not to impinge the riser wall. Yet another objective of the instant invention is to be able to discharge the atomized feed in a substantially radial outward direction with multiple fan sprays, thus achieving a uniform feed distribution across the riser.

SUMMARY OF THE INVENTION

In a fluid catalytic cracking unit (FCCU), the feed injection system is one of the most critical designs. For peak performance, the feed injection system must distribute the hydrocarbon feed in a fine spray having a uniform coverage across the riser and a narrow droplet size distribution. The present invention improves feed atomization of bottom entry injection systems, thus eliminating the need for a side entry configuration and its drawbacks. The present invention also provides superior feed distribution, compared to that of prior art side entry nozzles.

The improved feed injection method and apparatus includes at least one nozzle which comprises:

a first conduit for providing a passageway for enabling a first dispersing gas to floe therethrough;

a first cap covering the end of said first conduit, said first cap including at least one outlet passageway therethrough adapted for discharging said first dispersing gas in a generally radial outward and upward direction into a liquid hydrocarbon feed to form a mixture thereof;

a second conduit enclosing said first conduit and said first cap and spaced therefrom for providing a passageway for enabling a liquid hydrocarbon feed material to flow therethrough;

a second cap covering the end of said second conduit, said second cap including at least one segment of a circularly-shaped slot radially offset from the axis of the nozzle and serving as an outlet passageway therethrough, which passageway is substantially aligned with said outlet passageway on said first cap and is adapted for discharging a mixture of said liquid hydrocarbon feed and said first dispersing gas, said second cap being spaced from said first cap thereby forming a mixing zone therebetween for mixing said liquid hydrocarbon feed and said first dispersing gas; and a third conduit enclosing said second conduit and spaced therefrom for providing a passageway for enabling a second dispersing gas to flow therethrough and into said riser reactor.

In a preferred embodiment said second cap includes a plurality of segments of circularly-shaped slots radially offset from the axis of the nozzle forming outlet passageways therethrough adapted for discharging said mixture of liquid hydrocarbon feed and said first dispersing gas in multiple fan sprays and in a generally radial outward and upward direction.

DESCRIPTION OF THE PREFERRED EMBODIMENT

Figure 1:
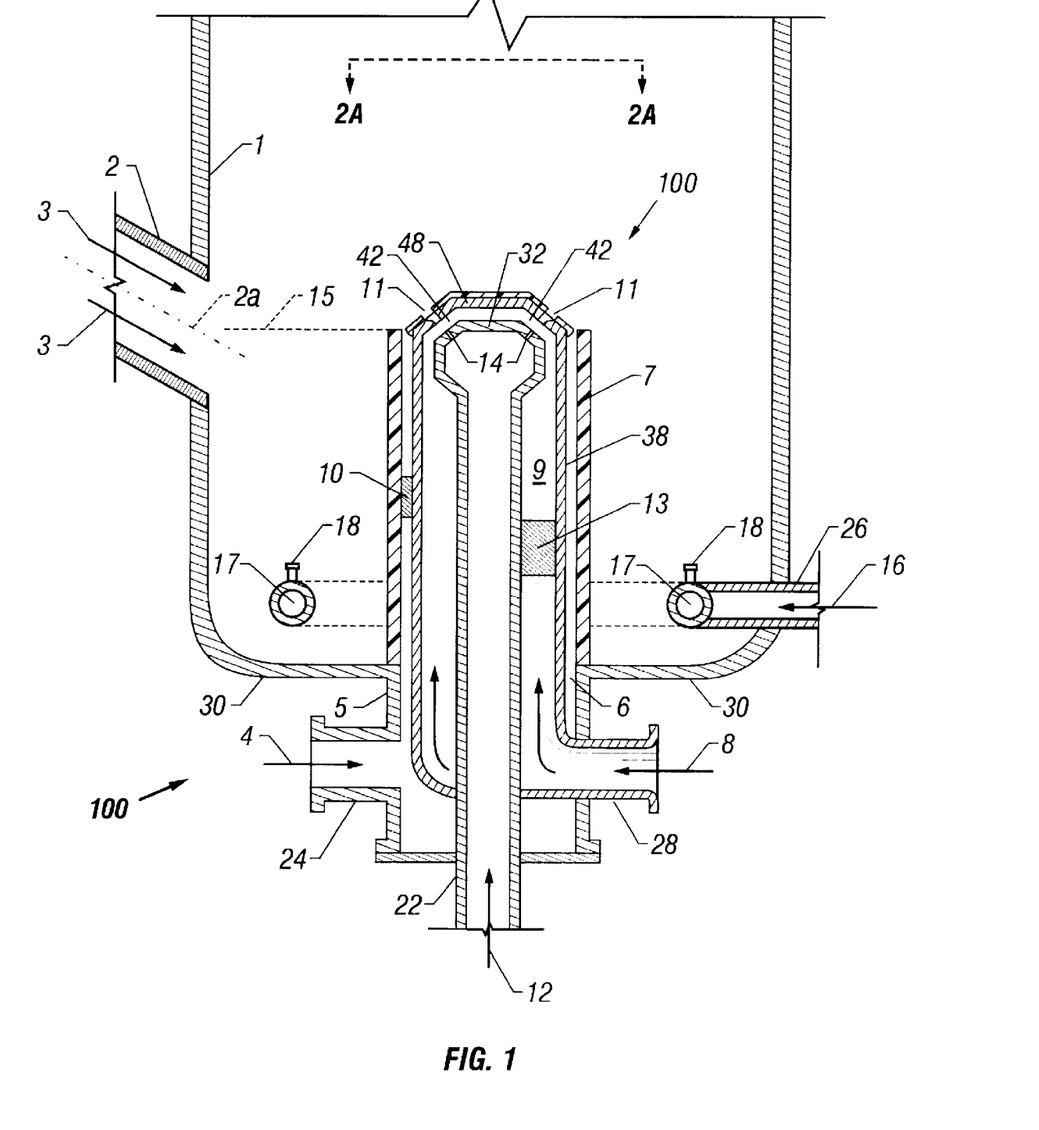
FIG. 1 is a preferred embodiment of a FCCU with a single bottom entry feed injection system.

Referring now to FIG. 1 which shows a preferred embodiment of the present invention, a catalytic cracker riser reactor 1 is connected to a regenerator standpipe 2 through which hot, regenerated catalyst 3 enters the riser bottom region. A liquid hydrocarbon feed 8, such as gas oil, and dispersing gas 4 and 12, such as steam, are introduced through a single bottom entry nozzle assembly 100.

Nozzle assembly 100 comprises three concentrically arranged conduits. A first conduit 22 provides a passageway for a first dispersing gas 12 and terminates in a first cap 32. First conduit 22 and first cap 32 are surrounded by a second conduit 38 terminating in a second cap 48, the annulus 9 formed thereby providing a passageway for liquid hydrocarbon feed 8. Second conduit 38 is, in turn, surrounded by a third conduit 5 which is open at the top. The external surface of conduit 5 is protected by an erosion resistant material 7, such as refractory or other material known to those skilled in the art, to prevent damage to the nozzle assembly 100 by the incoming hot, regenerator catalyst 3. The external surface of the second cap 48, extending beyond the termination of conduit 5 and into riser reactor 1, is protected by erosion resistant material, such as STELLITE 6 or other material known to those skilled in the art. A first annulus 6 is formed between conduit 5 and conduit 38. A second annulus 9 is formed between conduit 38 and conduit 22. Centering lugs 10 in the first annulus 6 keep conduit 38 centered within conduit 5. Centering lugs 13 in the second annulus 9 keep conduit 22 centered within conduit 38.

A first dispersing gas 12 enters first conduit 22 which terminates with a first cap 32 having at least one outlet passage 14 discharging in generally a radially outward and upward direction into mixing zone 42, located in the vicinity of the discharge of outlet passage 14 between first cap 32 and second cap 48. Liquid hydrocarbon feed 8 enters conduit 28, continues through substantially vertical second conduit 38 via annulus 9 to a second cap 48 and is mixed in a cross-flow with the first dispersing gas 12 in mixing zone 42, resulting in the formation of a fine two-phase mixture of small dispersed bubbles in heavy petroleum hydrocarbon liquid. Second cap 48 has at least one outlet passage 11 radially offset from the axis of the nozzle for emitting the mixture of hydrocarbon feed and first dispersing gas into the riser reactor 1 in a radially outward and upward direction. Passage 11 is substantially aligned with the discharge of the first dispersing gas 12 from outlet passage 14. As the fine two-phase mixture of small dispersed bubbles in heavy petroleum hydrocarbon passes through outlet passage 11 into riser reactor 1 to contact with regenerator catalyst 3, the two-phase mixture suddenly expands, forming a fine atomization of heavy petroleum hydrocarbon feed with narrow droplet size evenly distributed across the riser reactor 1.

Conduit 5 penetrates through the riser bottom 30 into riser 1 and terminates at a level 15 above the center line 2a of regenerator standpipe 2. A second dispersing gas 4 passes through conduit 24, and is directed into conduit 5 via the first annulus 6 and exits through the top of conduit 5 into the riser reactor 1 in a substantially longitudinal direction. The second dispersing gas 4 has several functions. One is to shield hot, regenerated catalyst 3 from damaging the feed injection nozzle 100 inside conduit 5 under normal operation. Another function is to provide emergency fluidization gas for transporting catalyst in case of feed outage.

Additional dispersing gas 16 can be introduced though conduit 26 to assist fluidization in the lower riser region. In FIG. 1, conduit 26 is shown connected to a single distribution ring 17 surrounding conduit 5 and having multiple nozzles 18. Other means known in the art, such as a perforated plate, can be used for distributing the additional dispersing gas 16. Although FIG. 1 shows an embodiment with only a single injection nozzle assembly 100, other arrangements, such as multiple feed assemblies 100 in a riser reactor, with each feed assembly 100 emitting at least one fan spray from outlet passage 11, can be used to achieve the same objective for large FCCUs with higher hydrocarbon feed rates. The number of feed nozzle assemblies 100 in a single riser can be any reasonable number, but is preferred to be in the range of one to six.

Figure 2A:
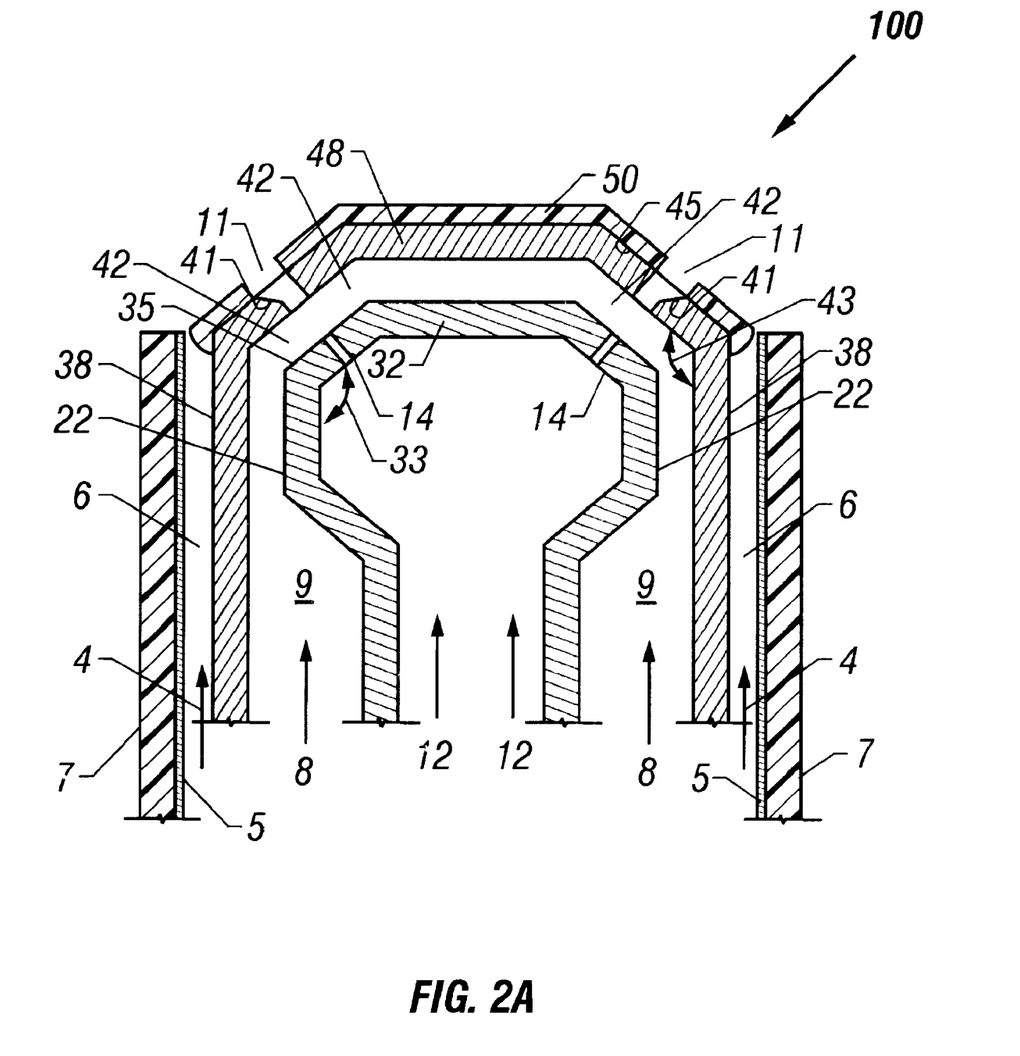
FIGS. 2A/2B/2C show detail design features of the preferred feed injection system of FIG. 1.
Figure 2B:
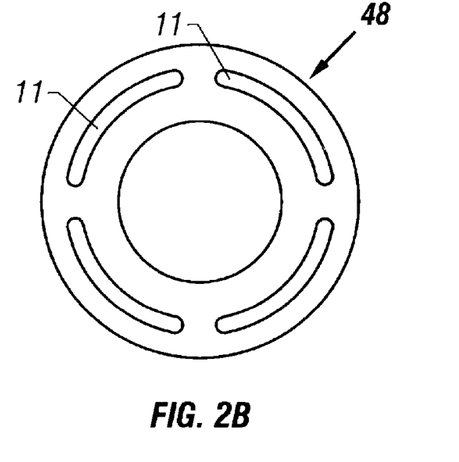
Figure 2C:
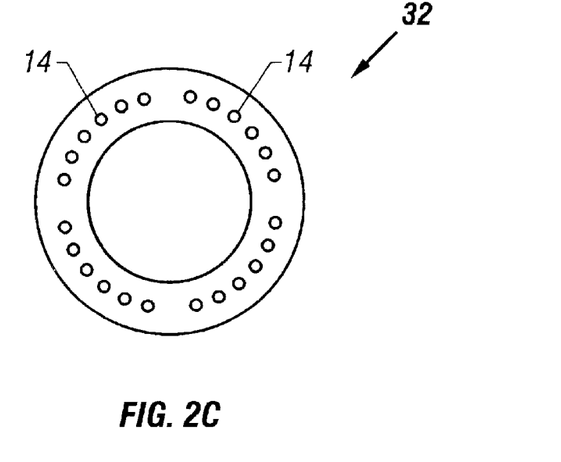

FIGS. 2A, 2B and 2C show details of the caps 32 and 48 which terminate conduits 22 and 38 respectively at the end of feed injection assembly 100 in the preferred embodiment of FIG. 1. FIG. 2A is a cross-sectional view, taken along the line 2A—2A of FIG. 1, of the conduits 22, 38 with their respective caps 32, 48 and conduit 5 with protection material 7. The first dispersing gas 12 passes through conduit 22 to first cap 32 and exits at dispersing gas outlet passages 14 into the mixing zone 42 which is in the vicinity of the discharge of outlet passage 14, between caps 32 and 48, and upstream of outlet discharge 11 which is radially offset from the axis of the nozzle. The outlet passage 14 is shown to be on conical surface 35 of cap 32 such that the first dispersion gas 12 is discharged through passage 14 in a generally radial outward and upward direction and mixed in a cross-flow with liquid hydrocarbon feed in the mixing zone 42. The angle 33 of the conical surface 35 of first cap 32 can be in a range of 100° to 170°, but is preferably in the range of 110° to 160°. The upward discharge angle of passage 14 can be in a range of 10° to 80° from the axis of nozzle assembly 100, but is preferably in the range of 20° to 70° from the axis of nozzle assembly 100. The amount of first dispersing gas 12 can be in the range of 0.2 to 7 weight percent of the hydrocarbon feed 8, but is preferably in the range of 0.5 to 5 weight percent of the hydrocarbon feed 8. The discharge velocity of first dispersing gas 12 through passage 14 can be in the range of 50 to 800 ft/sec, but is preferably in the range of 100 to 500 ft/sec. The hydrocarbon feed 8 passes through conduit 38 via annulus 9 to cap 48 and mixes in a cross-flow with the dispersing gas 12 from passages 14 in the mixing zone 42, resulting in the formation of a fine two-phase mixture of small steam bubbles in the liquid hydrocarbon just upstream of passage 11 which is radially offset from the axis of the nozzle and which is substantially aligned with the first dispersing gas outlet passage 14. The substantial alignment of passages 14 and 11 assures that the fine two-phase mixture of small steam bubbles in the liquid hydrocarbon passes through passage 11 as soon as the mixture is formed in the mixing zone 42, thus minimizing the tendency of re-coalescence and maximizing energy efficiency of the first dispersing gas for atomization. As the fine two-phase mixture of small steam bubbles in the liquid hydrocarbon passes through outlet passages 11 into the riser reactor 1, the two-phase mixture suddenly expands, due to the pressure drop through passage 11, resulting in the formation of a fine atomization of hydrocarbon feed 8 with narrow droplet size distribution and even distribution. The pressure drop through passages 11 can be in the range of 10 to 100 psi, but is preferably in the range of 20 to 70 psi. Outlet passage 11 is shown to have a chamfer 41 at the end of the passage 11 to assist the sudden expansion of two-phase flow and the fine atomization of hydrocarbon feed 8 into the riser reactor 1. Cap 48 and outlet passage 11 can include a protection layer 50, such as STELLITE or other material known to those skilled in the art, to prevent damage by the catalyst. The outlet passage 11 is shown to be on a conical surface 45 of cap 48 such that the mixture of first dispersion gas 12 and liquid hydrocarbon 8 is discharged through passage 11 in generally a radially outward and upward direction. The angle 43 of the conical surface 45 of cap 48 can be in a range of 100° to 170°, but is preferably in the range of 110° to 160°. The upward discharge angle of passage 11 can be in a range of 10° to 80° from the axis of nozzle assembly 100, but is preferably in the range of 20° to 70° from the axis of nozzle assembly 100. Although caps 32 and 48 are shown to include conical surfaces 35 and 45, respectively, other types of surfaces, such as spherical or elliptical surfaces, can be included on caps 32 and 48 as long as passages 14 and 11 can be positioned on these surfaces so as to discharge the first dispersion steam 12 and hydrocarbon feed 8 in generally a radially outward and upward direction.

FIG. 2B shows a plan view of the second cap 48 located at the end of hydrocarbon conduit 38. Cap 48 is shown to have four elongated, circularly-shaped outlet passages 11 on conical surface 45 radially offset from the axis of the nozzle as an example for emitting four fan sprays of mixtures of first dispersing gas 12 and hydrocarbon feed 8 in a radially outward and upward direction into the riser 1. The total number of outlet passages 11 may be any reasonable number, but is preferably in the range of one to twelve. The angle of each of the fan sprays emitted from passages 11 can be in the range of 30° to 120°, preferably in the range of 60° to 100°. Although each of the fan sprays is shown to emit from a single circularly-shaped, elongated outlet passage 11 in FIG. 2B, other forms of passages known in the art, such as segments of straight slots, multiple parallel slots, or multiple orifices arranged in segments of lines, multiple parallel slots, or multiple orifices arranged in segments of lines or parallel lines, can be used to generate each individual fan spray from cap 48 in a radially outward and upward direction into the riser 1.

FIG. 2C shows a plan view of the first cap 32 located at the end of the first dispersing gas conduit 22. Cap 32 is shown as having four groups of circular outlet passages 14 on conical surface 35 arranged in four curved lines behind, and substantially aligned with, passages 11 of FIG. 2B. Although each group of dispersing gas outlet passages 14 is shown to consist of six substantially round passages for each individual fan spray emitted from passages 11, the number of passages 14 in each group could be any reasonable number, but is preferably in the range of four to twenty. Other forms of passages known in the art, such as multiple substantially round passages arranged in parallel lines, a straight slot, or multiple parallel slots, can be used as dispersing gas outlet passages 14 for generating each individual fan spray from passage 11.

The major improvement of the present invention over the prior art bottom entry nozzles, such as U.S. '547, is much better feed atomization and riser reliability. In the prior art of U.S. '547, shown in FIG. 3, the hydrocarbon enters through conduit 5 and single phase atomization nozzle 11 and dispersing gas enters through conduit 4 and annulus 6. Feed atomization occurs as the feed exits single phase atomization nozzle 11, far upstream from the exit into the riser 2. The feed from nozzle 11 and the dispersing gas in annulus 6 are both moving in a substantially axial direction with very little cross-flow mixing between the two. The atomized feed droplets are then conveyed in substantially longitudinal flow, by the dispersing gas entering through conduit 4, and impinge on the exit deflection cone 13 which suddenly alters the direction of the feed droplets from substantially longitudinal flow to radially outward and upward.

Figure 3:
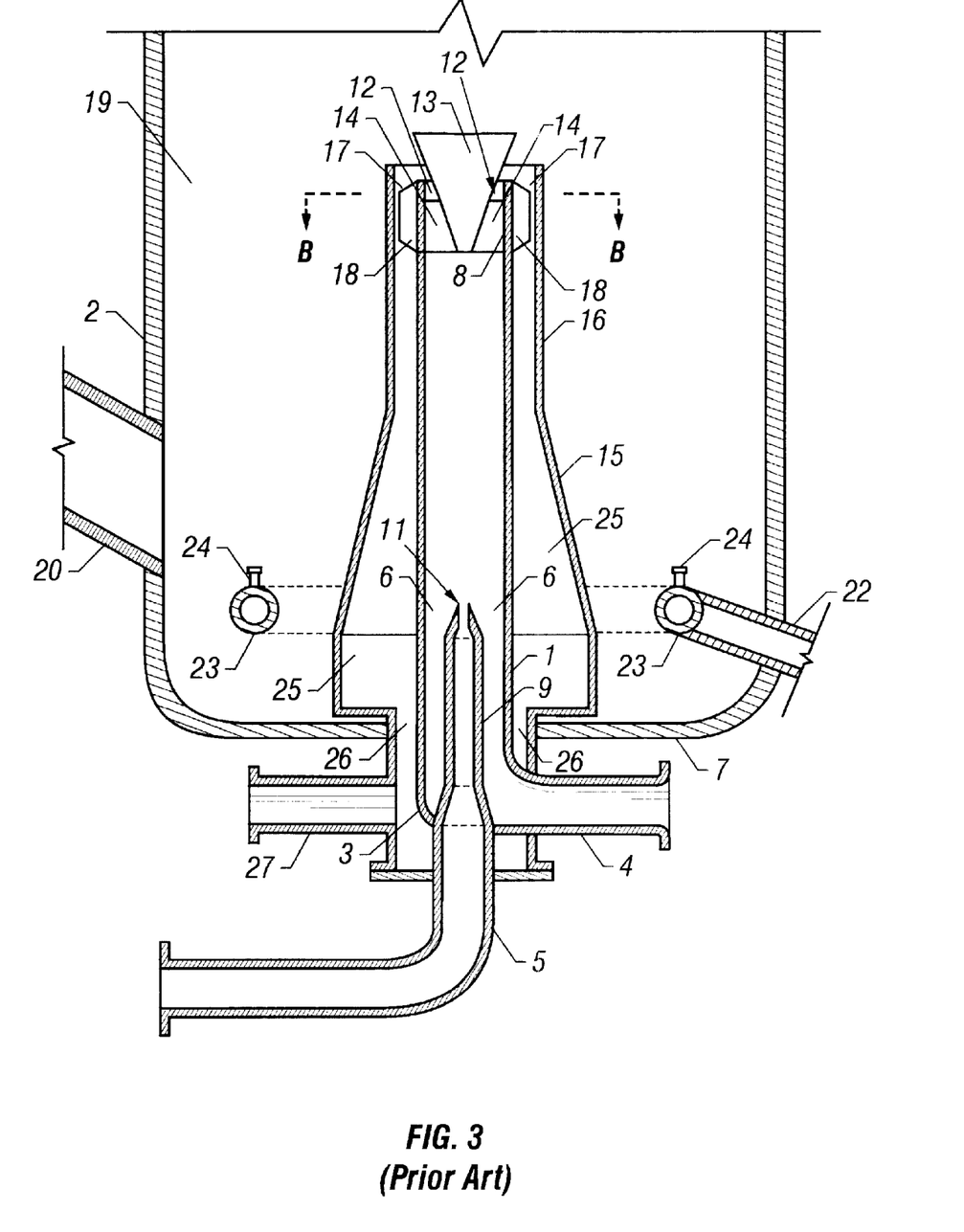
FIG. 3 shows a prior art single bottom entry feed injection system.

The improvements of the present invention over the prior art of U.S. '547' includes:

Two phase atomization vs. single phase atomization: In U.S. '547', feed atomization occurs mostly through a single-phase atomization nozzle 11 as shown in FIG. 3 which is far less efficient compared to the present invention using a two-fluid atomizer through caps 32 and 48 in FIG. 1.

Atomization at the exit vs. upstream atomization: In U.S. '547, feed atomization occurs mostly through a single-phase atomization nozzle 11 shown in FIG. 3 far upstream of the final exit. As the atomized feed droplets are conveyed by the dispersing gas, droplets can coalesce on the surface of the conveying conduit leading to poor atomization. In the present invention, feed atomization occurs at the very exit by aligning first dispersing gas outlet passage 14 with passage 11, forming a fine two-phase mixture of small steam bubbles in the liquid hydrocarbon by cross-flow mixing in mixing zone 42 between caps 32 and 48 just upstream of passage 11, and passing the two-phase mixture through outlet passages 11 for fine atomization. There is no conveying conduit with atomized droplets which could lead to re-coalescence.

Direct discharge vs. diverter cone: In U.S. '547, a diverter cone at the exit is used to suddenly alter the direction of the feed droplets from substantially longitudinal flow to radially outward and upward. This leads to impingement of droplets on the cone surface and significant worsening of atomization. In the present invention, feed atomization occurs at the exit of caps 32 and 48 which direct the first dispersing gas 12 and the mixture of the first dispersing gas 12 and liquid hydrocarbon feed 8 in substantially radial directions through passages 14 and 11. There is no diverter cone or sudden direction change of atomized feed which could lead to re-coalescence.

Because of the improvement in feed atomization by the present invention over the prior art bottom entry nozzles, such as U.S. '547, the jet penetration of hydrocarbon feed emitted in a radially outward direction into the riser is shorter with the present invention. This prevents the riser damage caused by direct impingement of hydrocarbon feed which is known to occur with the prior art bottom entry nozzles, such as U.S. '547, which discharges hydrocarbon feed in a sheet of liquid.

Atomization of two nozzles, one according to the present invention of FIGS. 1 and 2 and the other according to the prior art of U.S. '547 patent, shown as FIG. 3 herein, were tested in ambient condition using air to simulate the dispersing gas and water to simulate the hydrocarbon feed. Test results confirm that the nozzle of the present invention has much better atomization, compared to the prior art of US '547 patent. The average droplet size generated by the nozzle of the present invention was about ⅓ of the prior art design of U.S. '547 patent under the same operating conditions. Test results also confirm that the nozzle of the present invention has shorter jet penetration, compared to the prior art of US '547 patent.

Figure 4A:
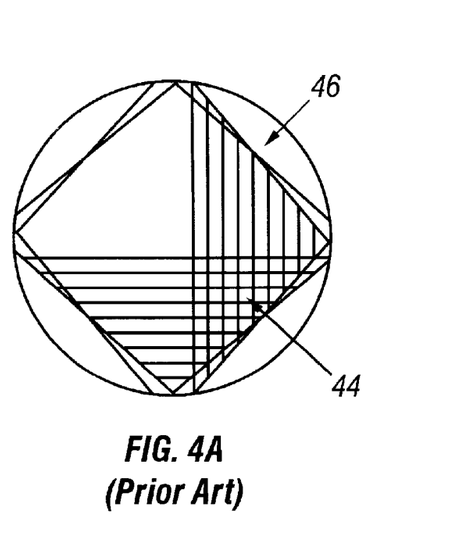
FIG. 4A shows a plan view of feed distribution in the riser of prior art side entry feed nozzles.
Figure 4B:
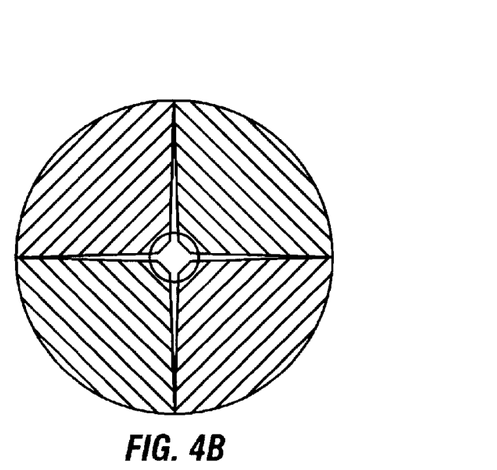
FIG. 4B shows a plan view of improved feed distribution provided by a single nozzle according to the present invention.

The major improvements of the present invention over the prior art of side entry nozzles, such as U.S. Pat. No. 5,794,857 to Chen et al., are that adequate feed atomization can be achieved by the present invention of the improved bottom entry nozzle, thus overcoming the need for using side entry nozzles and the associated drawbacks of lower riser volume, higher catalyst deactivation and lower catalyst circulation. The cost of installing the improved bottom entry nozzle of the present invention is also much lower compared to typical side entry nozzles. Furthermore, a better feed distribution across the riser reactor can be achieved with the present invention when compared to typical multiple side entry nozzles of prior art. This is demonstrated by FIG. 4A which shows a plan view of typical prior art feed distribution in a cross section of the riser using four side entry nozzles of prior art, such as U.S. Pat. No. 5,794,857, spaced 90° apart, emitting four fan jets radially inward, having an angle of 95° from each fan spray. FIG. 4A shows that substantial areas, shown as the double-shaded areas 44, are covered by overlapping spray patterns from adjacent nozzles. It also shows that substantial areas, shown as blank areas 46, are not covered at all by any of the four fan sprays. The combination of these two features leads to undesirable results of uneven feed distribution by the prior art of typical side entry nozzles where some areas in the riser have no feed coverage at all and some areas have too much feed. FIG. 4B shows the feed distribution patterns in a cross-section of the riser reactor for a single bottom entry feed nozzle emitting four flat, fan sprays radially outward, spaced 90° apart, according to the preferred embodiment of FIGS. 1 and 2 with four circularly-shaped slot outlet passages 11 radially offset from the axis of the nozzle. Each fan spray emitted from the passages 11 has an angle of 95°. It is shown that, with exactly the same number of jets and the same spray angle as the prior art side entry nozzles, but changing the feed injection from radially inward in FIG. 4A to radially outward in FIG. 4B, most of the riser reactor area is evenly covered by the present invention and there is no overlapping of adjacent fan sprays. This clearly demonstrates that the present invention has superior feed distribution when compared to the typical feed distribution of prior art side entry nozzles, such as U.S. Pat. No. 5,794,857 to Chen et al.

EXAMPLE

A single bottom entry nozzle according to the present invention of FIG. 1 was installed in one of Assignee's FCC units which originally had a single bottom entry nozzle according to the prior art, shown in FIG. 2 of U.S. '547 patent, reproduced as FIG. 3 herein.

Operating conditions of the FCCU, before and after the revamp, are listed in Table 1:

TABLE 1

|  |  | Average Post Revamp | Average Pre Revamp | Delta |
|---|---|---|---|---|
| PROCESS CONDITIONS | | | | |
| Feed Rate | ton/day | 5281.3 | 5185.8 | 95.5 |
| Feed Temperature | ton/day | 268.7 | 260.3 | 8.4 |
| First dispersion Steam | ton/day | 80.0 | 36.9 | 44.1 |
| Second dispersion Steam | ton/day | 11.5 | 11.5 | 0 |
| Additional dispersing Steam | ton/day | 24.2 | 18.6 | 5.6 |
| Reactor Temperature | ° C. | 494.2 | 493.2 | 1.1 |
| Regen Temperature | ° C. | 700.9 | 697.2 | 3.8 |
| Liftpot Pressure | barg | 2.0 | 2.2 | −0.2 |
| Reactor Pressure | barg | 1.8 | 1.9 | −0.2 |
| Regen Pressure | barg | 2.0 | 2.2 | −0.2 |
| Cat Circulation Rate | ton/min | 17.7 | 17.9 | −0.2 |

The performance of the FCCU, before and after the revamp, are listed in Table 2:

TABLE 2

|  | Average Pre Revamp | Average Post Revamp Delta Wt. % of Feed |
| --- | --- | --- |
| C2- | base case | −0.2 |
| LPG | base case | −1.1 |
| Gasoline | base case | 1.1 |
| Light cycle oil | base case | 1.2 |
| Heavy cycle oil & slurry | base case | −1.3 |
| Coke | base case | 0.0 |

The data show that the present invention improves the FCCU performance by reducing the low value products of C2-dry gas, LPG and the combination of heavy cycle oil and slurry by 0.2, 1.1 and 1.3 weight %, respectively, and increasing high value products of gasoline and light cycle oil by 1.1 and 1.2 weight %, respectively. In addition to the benefit of producing more valuable products, the FCCU also processed 1.9% more feed, as shown in the previous table of operating conditions.

What is claimed is:

1. A nozzle for use in a fluid catalytic cracking unit comprising:

a first conduit for providing a passageway for enabling a first dispersing gas to flow therethrough;

a first cap covering the end of said first conduit, said first cap including at least one outlet passageway therethrough adapted for discharging said first dispersing gas into a liquid hydrocarbon feed material;

a second conduit enclosing said first conduit and spaced therefrom to form an annulus therebetween thereby providing a passageway for enabling said liquid hydrocarbon feed material to flow therethrough;

a second cap covering the end of said second conduit, said second cap including at least one segment of a circularly-shaped slot radially offset from the axis of the nozzle and serving as an outlet passageway therethrough, which passageway is substantially aligned with said outlet passageway on said first cap and is adapted for discharging a mixture of said liquid hydrocarbon feed and said first dispersing gas, said second cap being spaced from said first cap thereby forming a mixing zone therebetween for mixing said liquid hydrocarbon feed and said first dispersing gas; and a third conduit surrounding said second conduit and forming an annulus therebetween for providing a passageway for enabling a second dispersing gas to flow therethrough.

2. The nozzle of claim 1 wherein said at least one outlet passageway on said first cap includes a plurality of outlet passageways for discharging said first dispersing gas into said liquid hydrocarbon feed material to form a mixture thereof, and said at least one outlet passageway on said second cap includes a plurality of outlet passageways therethrough adapted for discharging said mixture of said liquid hydrocarbon feed and said first dispersing gas in multiple fan sprays and in a generally radial outward and upward direction.

3. The nozzle of claim 1 wherein said second cap includes a conical surface and at least one outlet passageway on said conical surface.

4. The nozzle of claim 1 wherein said slot includes a chamfer.

5. The nozzle of claim 1 wherein said at least one outlet passageway through said second cap is adapted to discharge said mixture of said liquid hydrocarbon feed and said first dispersing gas in a generally radial outward and upward direction.

6. The nozzle of claim 5 wherein said mixture is discharged at an upward discharge angle in the range of about 10° to 80° from the axis of said nozzles.

7. The nozzle of claim 3 wherein said first cap includes a conical surface having at least one outlet passageway.

8. The nozzle of claim 1 wherein said at least one outlet passageway through said first cap is adapted to discharge said first dispersing gas in a generally radial outward and upward direction.

9. The nozzle of claim 8 wherein the upward discharge angle of said outlet passageway is in the range of about 10° to 80° from the axis of said nozzle.

10. The nozzle of claim 7 wherein said at least one outlet passageway on said conical surface of said first cap is substantially aligned with said at least one outlet passageway on said conical surface of said second cap.

11. The nozzle of claim 1 wherein said at least one outlet passageway through said first cap includes a plurality of substantially round holes.

12. The nozzle of claim 11 wherein said plurality of substantially round holes are arranged into at least one line.

13. A fluid catalytic cracking unit comprising:

at least one riser reactor;

at least one nozzle located in the bottom of said riser, said nozzle comprising:

a first conduit for providing a passageway for enabling a first dispersing gas to flow therethrough;

a first cap covering the end of said first conduit, said first cap including at least one outlet passageway therethrough adapted for discharging said first dispersing gas in a generally radial outward and upward direction into a liquid hydrocarbon feed to form a mixture thereof;

a second conduit enclosing said first conduit and said first cap and spaced therefrom for providing a passageway for enabling a liquid hydrocarbon feed material to flow therethrough;

a second cap covering the end of said second conduit, said second cap including at least one segment of a circularly-shaped slot radially offset from the axis of the nozzle and serving as an outlet passageway therethrough, which passageway is substantially aligned with said outlet passageway on said first cap and is adapted for discharging a mixture of said liquid hydrocarbon feed and said first dispersing gas, said second cap being spaced from said first cap thereby forming a mixing zone therebetween for mixing said liquid hydrocarbon feed and said first dispersing gas; and a third conduit enclosing said second conduit and spaced therefrom for providing a passageway for enabling a second dispersing gas to flow therethrough and into said riser reactor.

14. The fluid catalytic cracking unit of claim 13 wherein said second cap terminates at a point above the level of the centerline of said regenerated catalyst conduit.

15. The fluid catalytic cracking unit of claim 13 wherein said at least one outlet passageway on said first cap includes a plurality of outlet passageways for discharging said first dispersing gas into a liquid hydrocarbon feed material to form a mixture thereof, and said at least one outlet passageway on said second cap includes a plurality of outlet passageways therethrough adapted for discharging said mixture of liquid hydrocarbon feed and said first dispersing gas in multiple fan sprays and in a generally radial outward and upward direction.

16. The fluid catalytic cracking unit of claim 13 wherein said mixture is discharged at an upward discharge angle in the range of about 10° to 80° from the axis of said nozzle.

17. A fluid catalytic cracking unit comprising:

at least one riser reactor;

a plurality of nozzles located in the bottom of said riser, each of said nozzles comprising:

a first conduit for providing a passageway for enabling a first dispersing gas to flow therethrough;

a first cap covering the end of said first conduit, said first cap including at least one outlet passageway therethrough adapted for discharging said first dispersing gas in a generally radial outward and upward direction into a liquid hydrocarbon feed to form a mixture thereof;

a second conduit enclosing said first conduit and said first cap and spaced therefrom for providing a passageway for enabling a liquid hydrocarbon feed material to flow therethrough;

a second cap covering the end of said second conduit, said second cap including at least one segment of a circularly-shaped slot radially offset from the axis of the nozzle and serving as an outlet passageway therethrough, which passageway is substantially aligned with said outlet passageway on said first cap and is adapted for discharging a mixture of said liquid hydrocarbon feed and said first dispersing gas, said second cap being spaced from said first cap thereby forming a mixing zone therebetween for mixing said liquid hydrocarbon feed and said first dispersing gas; and a third conduit enclosing said second conduit and spaced therefrom for providing a passageway for enabling a second dispersing gas to flow therethrough and into said riser reactor.

18. The fluid catalytic cracking unit of claim 17 wherein said mixture is discharged at an upward discharge angle in the range of about 10° to 80° from the axis of each of said nozzles.

* * * * *